(12) United States Patent
Antonsson

(10) Patent No.: US 12,325,415 B2
(45) Date of Patent: *Jun. 10, 2025

(54) APPARATUS AND METHOD FOR PROCESSING VEHICLE SIGNALS TO COMPUTE A BEHAVIORAL HAZARD MEASURE

(71) Applicant: Systomix, Inc., Pasadena, CA (US)

(72) Inventor: Erik K. Antonsson, Pasadena, CA (US)

(73) Assignee: Systomix, Inc., Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/049,981

(22) Filed: Oct. 26, 2022

(65) Prior Publication Data

US 2023/0071808 A1 Mar. 9, 2023

Related U.S. Application Data

(63) Continuation of application No. 16/881,998, filed on May 22, 2020, now Pat. No. 11,511,737.

(Continued)

(51) Int. Cl.
*B60W 30/095* (2012.01)
*B60W 30/09* (2012.01)
(Continued)

(52) U.S. Cl.
CPC ........ *B60W 30/0956* (2013.01); *B60W 30/09* (2013.01); *B60W 30/162* (2013.01);
(Continued)

(58) Field of Classification Search
CPC ............ B60W 30/0956; B60W 30/09; B60W 30/162; B60W 30/18163;
(Continued)

(56) References Cited

U.S. PATENT DOCUMENTS 5,798,949 A 8/1998 Kaub
5,913,375 A 6/1999 Nishikawa
(Continued)

FOREIGN PATENT DOCUMENTS

DE 102015115135 A1 3/2017
DE 112016004471 T5 6/2018
(Continued)

OTHER PUBLICATIONS

AIChE Academy (2020). Near-miss management to develop dynamic leading indicators to predict incidents, Process Safety, located at https://www.aiche.org/academy/videos/conference-presentations/near-miss-management-develop-dynamic-leading-indicators-predict-incidents, 3 total pages.

(Continued)

*Primary Examiner* — Ashley L Redhead, Jr.
(74) *Attorney, Agent, or Firm* — Cooley LLP

(57) ABSTRACT

A non-transitory computer readable storage medium has instructions executed by a processor to obtain the relative speed between a first traffic object and a second traffic object. The separation distance between the first traffic object and the second traffic object is received. The relative speed and the separation distance are combined to form a quantitative measure of hazard encountered by the first traffic object. The obtain, receive and combine operations are repeated to form cumulative measures of hazard associated with the first traffic object. The cumulative measures of hazard are analyzed to derive a first traffic object safety score for the first traffic object.

51 Claims, 9 Drawing Sheets

Related U.S. Application Data

(60) Provisional application No. 62/851,930, filed on May 23, 2019.

(51) Int. Cl.
 *B60W 30/16* (2020.01)
 *B60W 30/18* (2012.01)

(52) U.S. Cl.
 CPC ............... *B60W 30/18163* (2013.01); *B60W 2554/4041* (2020.02); *B60W 2554/4042* (2020.02); *B60W 2554/4044* (2020.02); *B60W 2554/4049* (2020.02); *B60W 2554/804* (2020.02)

(58) Field of Classification Search
 CPC . B60W 2554/4041; B60W 2554/4042; B60W 2554/4044; B60W 2554/4049; B60W 2554/804; B60W 60/0059; B60W 60/0061; B60W 60/007; B60W 60/0053; B60W 60/005; B62D 15/0265; B60G 2800/242; B60T 2201/02; B60T 2201/022; B60T 2201/024
 See application file for complete search history.

(56) References Cited

U.S. PATENT DOCUMENTS

| | | | |
|---|---|---|---|
| 6,662,141 B2 | 12/2003 | Kaub | |
| 7,085,633 B2 | 8/2006 | Nishira et al. | |
| 7,113,867 B1 | 9/2006 | Stein | |
| 7,558,672 B2 | 7/2009 | Egami et al. | |
| 8,269,617 B2 | 9/2012 | Cook et al. | |
| 8,805,707 B2 | 8/2014 | Schumann, Jr. et al. | |
| 8,849,501 B2 | 9/2014 | Cook et al. | |
| 8,854,199 B2 | 10/2014 | Cook et al. | |
| 8,884,759 B2 | 11/2014 | Oktem et al. | |
| 8,981,963 B2 | 3/2015 | Emura et al. | |
| 9,081,650 B1 | 7/2015 | Brinkmann et al. | |
| 9,174,672 B2 * | 11/2015 | Zeng | G01S 13/931 |
| 9,358,976 B2 | 6/2016 | Stierlin | |
| 9,367,065 B2 | 6/2016 | Dolgov et al. | |
| 9,535,878 B1 | 1/2017 | Brinkmann et al. | |
| 9,682,703 B2 | 6/2017 | Okita | |
| 9,701,307 B1 | 7/2017 | Newman et al. | |
| 9,718,468 B2 * | 8/2017 | Barfield, Jr. | B60W 50/0097 |
| 9,886,856 B2 * | 2/2018 | Dougherty | G08G 1/162 |
| 9,928,432 B1 | 3/2018 | Sathyanarayana et al. | |
| 9,965,956 B2 | 5/2018 | Tsushima et al. | |
| 9,989,637 B2 | 6/2018 | Rashid et al. | |
| 9,996,856 B2 | 6/2018 | Chaouki et al. | |
| 10,262,533 B2 | 4/2019 | Takada et al. | |
| 10,268,909 B2 | 4/2019 | Sathyanarayana et al. | |
| 10,407,061 B2 * | 9/2019 | Ohmura | B60W 30/0953 |
| 10,492,355 B2 * | 12/2019 | Kelley | G05D 1/0214 |
| 10,636,304 B2 | 4/2020 | Takada et al. | |
| 11,142,195 B2 | 10/2021 | Takamatsu et al. | |
| 11,315,420 B2 | 4/2022 | Takada et al. | |
| 11,511,737 B2 | 11/2022 | Antonsson | |
| 11,511,767 B2 | 11/2022 | Lund et al. | |
| 2004/0051659 A1 | 3/2004 | Garrison | |
| 2005/0259853 A1 | 11/2005 | Miyai et al. | |
| 2007/0061222 A1 | 3/2007 | Allocca et al. | |
| 2007/0112514 A1 | 5/2007 | Ekmark et al. | |
| 2008/0036579 A1 | 2/2008 | Boss et al. | |
| 2009/0074246 A1 | 3/2009 | Distante et al. | |
| 2009/0143986 A1 | 6/2009 | Stein et al. | |
| 2010/0169009 A1 * | 7/2010 | Breed | G08G 1/161 340/436 |
| 2010/0191391 A1 | 7/2010 | Zeng | |
| 2011/0125372 A1 | 5/2011 | Ito | |
| 2011/0210872 A1 | 9/2011 | Molander | |
| 2012/0287276 A1 | 11/2012 | Dwivedi et al. | |
| 2012/0314071 A1 | 12/2012 | Rosenbaum et al. | |
| 2013/0054128 A1 * | 2/2013 | Moshchuk | B62D 15/0265 701/301 |
| 2013/0166150 A1 | 6/2013 | Han et al. | |
| 2014/0297170 A1 | 10/2014 | Sakima et al. | |
| 2015/0112546 A1 | 4/2015 | Ochsendorf et al. | |
| 2015/0284001 A1 | 10/2015 | Watanabe et al. | |
| 2015/0344030 A1 | 12/2015 | Damerow et al. | |
| 2016/0163198 A1 | 6/2016 | Dougherty | |
| 2016/0169690 A1 | 6/2016 | Bogovich et al. | |
| 2016/0176397 A1 | 6/2016 | Prokhorov et al. | |
| 2017/0039850 A1 | 2/2017 | Vanden Berg et al. | |
| 2017/0088142 A1 | 3/2017 | Hunt et al. | |
| 2017/0089710 A1 | 3/2017 | Slusar | |
| 2017/0101093 A1 * | 4/2017 | Barfield, Jr. | B60W 50/0097 |
| 2017/0200061 A1 | 7/2017 | Julian et al. | |
| 2017/0243485 A1 | 8/2017 | Rubin et al. | |
| 2017/0292848 A1 | 10/2017 | Nepomuceno et al. | |
| 2018/0237005 A1 | 8/2018 | Duan et al. | |
| 2018/0293441 A1 * | 10/2018 | Demaj | G06F 18/241 |
| 2018/0357484 A1 | 12/2018 | Omata | |
| 2018/0370526 A1 * | 12/2018 | Ohmura | G06V 20/584 |
| 2018/0374113 A1 * | 12/2018 | Ramirez | G08G 1/205 |
| 2019/0256063 A1 * | 8/2019 | Tamura | B60W 30/085 |
| 2019/0283763 A1 | 9/2019 | Wang | |
| 2020/0047772 A1 * | 2/2020 | Yasue | B60W 30/12 |
| 2020/0082311 A1 | 3/2020 | Amano et al. | |
| 2020/0139992 A1 * | 5/2020 | Oba | G08G 1/16 |
| 2020/0369270 A1 * | 11/2020 | Antonsson | G08G 1/0129 |
| 2021/0188356 A1 * | 6/2021 | Goto | B62D 6/00 |
| 2021/0300354 A1 * | 9/2021 | McGill | B60W 30/18154 |
| 2021/0319332 A1 * | 10/2021 | Isaac | B60W 50/14 |
| 2021/0370921 A1 * | 12/2021 | Silva | B60W 60/0027 |
| 2022/0055664 A1 * | 2/2022 | Koopman, Jr. | G08G 1/166 |
| 2022/0126818 A1 * | 4/2022 | Marcotte | B60W 30/09 |
| 2022/0215751 A1 | 7/2022 | Takada et al. | |

FOREIGN PATENT DOCUMENTS

| | | |
|---|---|---|
| EP | 3006297 A1 | 4/2016 |
| EP | 3462269 A1 | 4/2019 |
| EP | 3466789 A1 | 4/2019 |
| JP | H0966853 A | 3/1997 |
| JP | 2004171391 A | 6/2004 |
| JP | 2004189141 A | 7/2004 |
| JP | 2005161929 A | 6/2005 |
| JP | 2005219639 A | 8/2005 |
| JP | 5447371 B2 | 3/2014 |
| JP | 2017038166 A | 2/2017 |
| JP | 6274048 B2 | 2/2018 |
| JP | 2018084989 A | 5/2018 |
| JP | 2018156462 A | 10/2018 |
| WO | WO-2007123176 A1 | 11/2007 |
| WO | WO-2009128398 A1 | 10/2009 |
| WO | WO-2013039911 A1 | 3/2013 |
| WO | WO-2014154771 A1 | 10/2014 |
| WO | WO-2016135561 A1 | 9/2016 |
| WO | WO-2017038166 A1 | 3/2017 |
| WO | WO-2018161774 A1 | 9/2018 |
| WO | WO-2020026318 A1 | 2/2020 |
| WO | WO-2020237207 A1 | 11/2020 |

OTHER PUBLICATIONS

CARR (2020). Centre for Analysis of Risk and Regulation, located at http://www.lse.ac.uk/accounting/CARR, 6 total pages.

Goodman, J.E. et al. (2015). "Rethinking meta-analysis: Applications for air pollution data and beyond," Risk Analysis 35:1017-1039.

Hayward, J.C. (1972). "Near-miss determination through use of a scale of danger," Transportation Research Board, National Academy of Sciences, Issue No. 364, pp. 24-35.

Hirai, S. et al. (2007). Incident detection using probe data determining thresholds of a near miss, 14th World Congress on Intelligent Transport Systems, pp. 3388-3395.

International Search Report dated Aug. 25, 2020, for PCT Application No. PCT/US2020/034365, filed on May 22, 2020, 2 pages.

Kataoka, K. et al. (2018). Drive video analysis for the detection of traffic near-miss incidents, National Institute of Advanced Industrial

(56) References Cited

OTHER PUBLICATIONS

Science and Technology (AIST), National Traffic Science and Environment Laboratory (NTSEL), Japan.
Lytx (2020). Why near-collision and near-miss analysis matters, Driving Perspective Blog, located at https://resources.lytx.com/blog/why-near-collision-and-near-miss-analysis-matters, 3 total pages.
Madsen, P. et al. (2016). "Airline safety improvement through experience with near-misses: A cautionary tale," Risk Analysis 36:1054-1066.
Meel, A. et al. (2006). "Plant-specific dynamic failure assessment using Bayesian theory," Chem. Eng. Sci. 61:7036-7056.
Phimister J.R. et al. (2003). "Near-miss incident management in the chemical process industry," Risk Analysis 23:445-459.
Risk & Regulation (2010). "Special issue on close calls, near misses and early warnings," Magazine of the ESRC Centre for Analysis and Risk & Regulation, located at http://www.lse.ac.uk/accounting/assets/CARR/documents/R-R/2010-July-Special-Issue-on-Close-Calls.pdf, 20 total pages.
Wikipedia (2020). Moving Average, located at https://en.wikipedia.org/wiki/Moving_average#Exponential_moving_average, 12 total pages.
Wikipedia (2020). Sigmoid Function, located at https://en.wikipedia.org/wiki/Sigmoid_function, 4 total pages.
Written Opinion of the International Searching Authority dated Aug. 25, 2020, for PCT Application No. PCT/US2020/034365, filed on May 22, 2020, 6 pages.
Extended European Search Report for European Application No. EP20200809682 dated Jul. 3, 2023, 9 pages.
International Preliminary Report on Patentability for Application No. PCT/US2020/034365 dated Dec. 2, 2021, 8 pages.

* cited by examiner

APPARATUS AND METHOD FOR PROCESSING VEHICLE SIGNALS TO COMPUTE A BEHAVIORAL HAZARD MEASURE

CROSS-REFERENCE TO RELATED APPLICATION

This application is a continuation of U.S. application Ser. No. 16/881,998, filed May 22, 2020, which claims priority to U.S. Provisional Patent Application Ser. No. 62/851,930, filed May 23, 2019, the contents of which are incorporated herein by reference.

FIELD OF THE INVENTION

This invention relates generally to measuring the safety of the operation of vehicles. More particularly, this invention is directed toward techniques for processing sensor signals to compute a behavioral hazard measure characterizing near-miss behaviors to assess safety.

BACKGROUND OF THE INVENTION

Safe transportation is a critical societal need. Traditionally, the field of transportation safety has focused on managing the dissipation of kinetic energy in collisions. As transport systems become increasingly automated, it is critical to establish leading indicators of the effectiveness and safety of sensing and decision-making, for human, automated, and human-assisted systems. Historical collision data has many disadvantages as an indicator of this type of safety, including its retrospective character, relative sparseness, and lack of linkage to causes. In contrast to collisions, near-misses (near-collisions) occur frequently at all levels of severity, from low-speed long-distance low severity to high-speed approaches at close proximity. Near-miss behaviors can be measured and can serve as leading indicators of the safety of vehicle sensing and decision-making.

There is an un-met need in the field of automotive safety to create a new and useful measure of near-misses to produce measures of hazards encountered by vehicles, and the safety of vehicle operations.

There is a need to provide a quantitative, repeatable, objective, independent, computable, nearly continuous measure of the safety and risk of the behavior of a subject vehicle. There is also a need to enable the analysis and comparison of the safety and risk of vehicles, vehicle systems, sensor configurations, decision-making, traffic, streets, intersections, and the like.

The current practice to measure the safety of the behavior and control of a vehicle is on the basis of the frequency of occurrence of collisions. In some cases, a measure of time-to-collision is used.

The number of disengagements of an onboard automated decision-making system per mile (where a disengagement is a manual override of the automated system, such as described in California, California Code of Regulations, Title 13, Div. 1, Ch. 1, Article 3.8, § 227.501) is also used as an indication of the performance and safety of the behavior of an automated or autonomous vehicle.

In the field of aviation, near-misses (defined as "loss of separation") are recorded and analyzed as leading indicators of possible or potential future accidents.

Collision occurrences are relatively infrequent, and many collisions occur as a result of multiple causes. As a result, collision occurrence data is not able to provide a repeatable, computable nearly continuous measure of the safety and risk of the behavior of a subject vehicle.

Time-to-collision is dependent on the street or road conditions and on the speed and maneuverability of each object in each traffic scenario. As a result, time-to-collision is not independent of road conditions nor speed nor capabilities of the subject vehicle and traffic objects, and as a result cannot be used as an independent, computable, nearly continuous measure of the safety and risk of the behavior of a subject vehicle.

The number of "disengagements" per mile is not a useful measure of the behavior or safety or risk of an automated vehicle. "Disengagements" can have many causes, which may not be related to the behavior or decision-making system of the vehicle. They are not repeat-able, are subject to the judgment of the safety driver and therefore occur due to subjective considerations and as a result are not objective, and are influenced by the selection of the conditions and scenarios under which the vehicle is operated and the operational policy or policies under which the driver operates.

Loss of separation incorporates no information on the speeds (relative nor absolute) of the vehicle an object and therefore is not able to indicate important characteristics of the severity of a near-miss.

In sum, there is a need for improved processing of sensor signals to compute a behavioral hazard measure of the operation of vehicles.

SUMMARY OF THE INVENTION

A non-transitory computer readable storage medium has instructions executed by a processor to obtain the relative speed between a first traffic object and a second traffic object. The separation distance between the first traffic object and the second traffic object is received. The relative speed and the separation distance are combined to form a quantitative measure of hazard encountered by the first traffic object. The obtain, receive and combine operations are repeated to form cumulative measures of hazard associated with the first traffic object. The cumulative measures of hazard are analyzed to derive a first traffic object safety score for the first traffic object.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
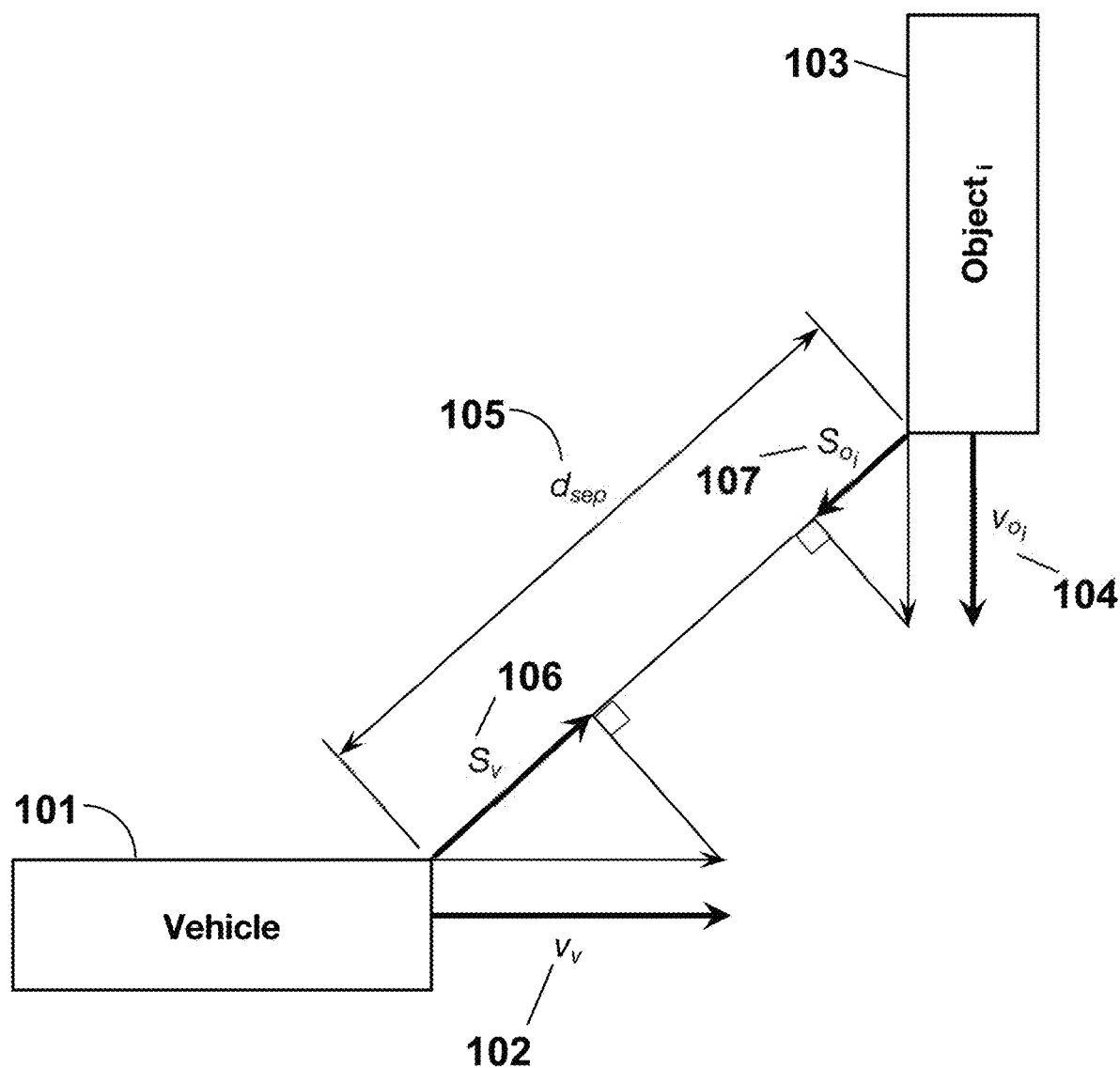
FIG. 1 shows an overhead view of a Subject Vehicle 101 moving with velocity $v_v$ 102 and Traffic Object$_i$ 103 moving with velocity $v_{o_i}$ 104, for example at an intersection of streets, not shown.

This invention provides a method to quantitatively determine the safety and risk of an automated vehicle. Unlike existing assessments of vehicle safety that pertain to the ability of the subject vehicle to protect its occupants after a collision begins, this measure assesses the performance of vehicles prior to and entirely without reference to collisions. Collision data is customarily gathered and assessed as a frequency of occurrence. Collisions among existing passenger vehicles are relatively infrequent, limiting the analytic and predictive power of collision occurrence data.

In contrast, the new measure disclosed here gathers movement data about vehicles continuously and a quantitative score reflecting the riskiness or safeness of the behavior of vehicles is computed nearly continuously, limited only by the rate at which the sensors provide updated measurements of the positions and velocities of vehicles and road conditions. The new measure disclosed here is based on the concept of near-misses, rather than collisions. In a near-miss a subject vehicle passes other traffic objects (e.g., vehicles, pedestrians, bicyclists, any moving object in a traffic scenario) but does not collide. The new measure is based, in part, on the proximity of the vehicle to each traffic object and the relative speed between the vehicle and each traffic object. In this way, the new measure can assess how near a vehicle is to a collision with another traffic object, and the relative speed. A small distance and low speed can be equivalent to a higher speed at a larger distance.

Because the new measure is computed nearly continuously for the subject vehicle and each traffic object, an aggregation of the data into a score is performed. One such aggregation results in a triplet of scalars representing the behavior of a vehicle: the largest score during a time-period of interest; the percent of time that the score is above an unsafe threshold; the percent of time that the score is above a risky threshold. While these three scalar numbers do not fully capture the behavior of a vehicle in a complex traffic scenario, they capture representative characteristics that can be compared.

The new measure can be used for evaluation of the performance of an automated vehicle, in particular the performance of the sensors on the vehicle, the configuration of the sensors on the vehicle, and the decision-making performed by the vehicle.

While the measure is intended to be applied to automated vehicles, it can equally be used to provide a score for human drivers (and, in-effect, their sensing, perception, and decision-making).

The measure can be computed from vehicle and traffic object data (positions and velocities) that are generated by sensors onboard one or more vehicles, either moving or stationary, or generated by stationary sensors, such as video cameras used for traffic management. No such driver behavior score exists today, other than the frequency of occurrence of collisions. Some drivers make less safe decisions than others; however, the infrequency of collisions, and the many contributing factors beyond driver decision-making to the occurrence of collisions, render this information of limited use to evaluate driver performance, or to judge whether a driver or operator (automated or human) is sufficiently safe to drive, particularly in congested and complex scenarios.

In addition, some practitioners in the field of traffic safety use an estimate of time-to-collision or TTC to indicate whether the vehicle being analyzed is in a condition of high likelihood of an impending collision. This measure has significant limitations, particularly in that the time until a collision will occur is highly dependent on the speed of the vehicle, the movements of the object with which it might collide, and the road conditions.

The novel measure of vehicle and traffic risk and safety described here utilizes the position and velocity of the subject vehicle, the position and velocity of each traffic object, the road conditions, and the maneuverability of the subject vehicle and traffic objects (maximum safe braking deceleration rate and maximum safe turning rate).

In all cases, the measure is computed sequentially for the subject vehicle in relation to each traffic object. For example, for a subject vehicle and eight (8) traffic objects, the measure will be computed in a pair-wise manner eight (8) times at each time at which sensor data is available, once for each traffic object in relation to the subject vehicle.

The invention is disclosed in connection with the following defined terms.

Measure: (noun) an amount (of something) ascertained by measuring. The value of a measure is expressed in established or standardized units. A measure is a standard of comparison.

Measure: (verb) to ascertain the amount or degree of (something) by using signals resulting from measurements, usually by comparison with a standard.

Hazard: A source or circumstance of potential damage or harm to an object or a person.

Risk: The chance or probability that an object or a person will be damaged or harmed if exposed to a hazard.

Subject Vehicle is the vehicle analyzed for behavior, safety and risk.

Traffic Objects are other vehicles, pedestrians, bicyclists, and other moving objects in a traffic scenario. In any particular traffic scenario or situation there will be N traffic objects (in addition to the subject vehicle). Each traffic object is identified by a number from 1 to N.

Traffic Scenario is a physical arrangement of roads and/or streets including traffic controls, street markings, curbs, crosswalks, and traffic objects. A typical traffic scenario may last 15-30 seconds, but may be shorter or longer in duration.

Near-Miss is a circumstance where the subject vehicle moves at some distance from a traffic object at some speed in relation to the traffic object, but a collision does not occur.

Position p is the vector position of the subject vehicle ($p_v$) and each traffic object ($p_{o_i}$).

Separation Distance $d_{sep}$ is the nearest distance between the subject vehicle and a traffic object, as shown in Equation (1) and illustrated in FIG. 1.

$$d_{sep} = |(\vec{p}_{o_i} - \vec{p}_v)| \quad (1)$$

Separation Distance $d_{sep}$ can also be a distance between representative points or locations on the subject vehicle and a traffic object, such as the center point of a bounding box or quadrilateral enclosing or representing the vehicle or object.

Separation Distance unit vector $u_{d_{sep}}$ is the unit vector in the direction of $d_{sep}$ as shown in Equation (2).

Velocity v is the vector velocity of the subject vehicle ($v_v$) and each traffic object ($v_{o_i}$).

Figure 2:
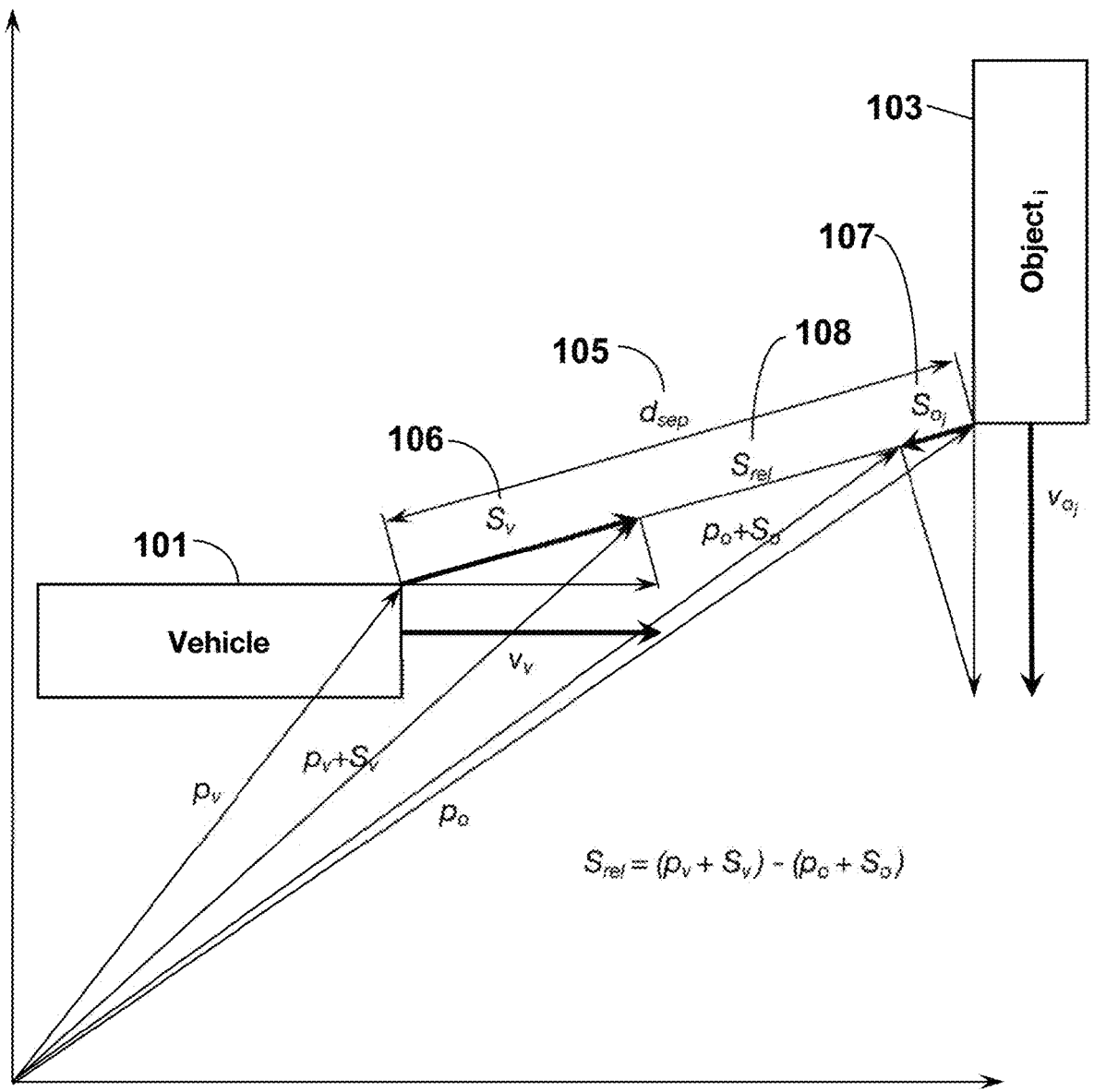
FIG. 2 shows an overhead view of the Relative Speed ($S_{rel}$) 108 between the Subject Vehicle 101 moving with velocity $v_v$ 102 and Traffic Object$_i$ 103 moving with velocity $v_{o_i}$ 104.

Relative Speed $S_{rel}$ is the relative scalar speed of the subject vehicle in relation to a traffic object, as shown in Equation (5) and illustrated in FIGS. 1 and 2.

$$\vec{u}_{d_{sep}} = (\vec{p}_{o_i} - \vec{p}_v)/(\vec{p}_{o_i} - \vec{p}_v)| \quad (2)$$

$$\vec{S}_v = (\vec{v}_v \cdot (\vec{p}_{o_i} - \vec{p}_v)) \times \vec{u}_{dse_p} \quad (3)$$

$$\vec{S}_{o_i} = (\vec{v}_{o_i} \cdot (\vec{p}_{o_i} - \vec{p}_v)) \times \vec{u}_{dse_p} \quad (4)$$

$$S_{rel} = |(\vec{p}p_v + \vec{S}_v) - (\vec{p}_{o_i} + \vec{S}_{o_i})| \quad (5)$$

$$\text{if } S_{rel} > |\vec{p}_{o_i} - \vec{p}_v|; \text{ separating} \quad (6)$$

$$\text{if } S_{rel} < |\vec{p}_{o_i} - \vec{p}_v|; \text{ approaching} \quad (7)$$

Absolute Speed is the rate (expressed in units of distance divided by time, e.g., feet per second, meters per second, km per hour, miles per hour) of movement of one traffic object with respect to the ground or with respect to a coordinate frame fixed to the earth.

Grip is the maximum safe acceleration that the subject vehicle or traffic objects can exhibit. The invention uses both braking grip (maximum safe acceleration or deceleration in the longitudinal direction) and lateral grip (maximum safe change of direction or acceleration or deceleration in the lateral direction) to incorporate the different capabilities of the subject vehicle or traffic objects to brake, steer, or change direction. Note that grip is adjusted to account for road or street conditions, e.g., grip will be reduced by slippery road or street conditions. The value of grip is a measure of maneuverability of the subject vehicle and traffic objects.

Acceleration is the rate of change of speed (expressed in units of distance divided by time squared, e.g., feet per second squared or feet per second per second, meters per second squared or meters per second per second). Acceleration can be either in the direction of travel (i.e., due to braking: braking deceleration) or transverse to the direction of travel (i.e., due to steering: lateral acceleration).

Lateral Acceleration $a_{lat}$ is the lateral acceleration exhibited by the subject vehicle or a traffic object when turning.

Saturation is a limitation on the maximum value that the numerical value of the measure produced by the invention can achieve.

Pair-wise is the successive consideration of the movement of the subject vehicle with each traffic object.

Perception-Reaction Time (PRT) is the time required by the driver or operator (either a human or a machine) to sense and perceive a traffic situation and to react to the traffic situation, e.g., by initiating braking or steering.

FIG. 1 shows an overhead view of the Subject Vehicle 101 moving with velocity $v_v$ 102 and Traffic Object$_i$ 103 moving with velocity $v_{o_i}$ 104. In the overhead view of the example traffic scenario illustrated in FIG. 1, the Subject Vehicle 101 and Traffic Object$_i$ 103 are approaching each other at an intersection of two streets, not shown. Separation Distance ($d_{sep}$) 105 between the Subject Vehicle 101 and Traffic Object$_i$ 103 is shown. Relative Speed ($S_{rel}$) is between the Subject Vehicle 101 moving with velocity $v_v$ 102 and Traffic Object$_i$ 103 moving with velocity $v_{o_i}$ 104. Relative Speed ($S_{rel}$) is computed from speed ($S_v$) 106 of the Subject Vehicle 101 along the direction of the Separation Distance ($d_{sep}$) 105 minus the speed ($S_{o_i}$) 107 of the Traffic Object 103 along the direction of the Separation Distance ($d_{sep}$) 105.

FIG. 2 shows an overhead view of the Relative Speed ($S_{rel}$) 108 between the Subject Vehicle 101 moving with velocity $v_v$ 102 and Traffic Object 103 moving with velocity $v_{o_i}$ 104.

Figure 3:
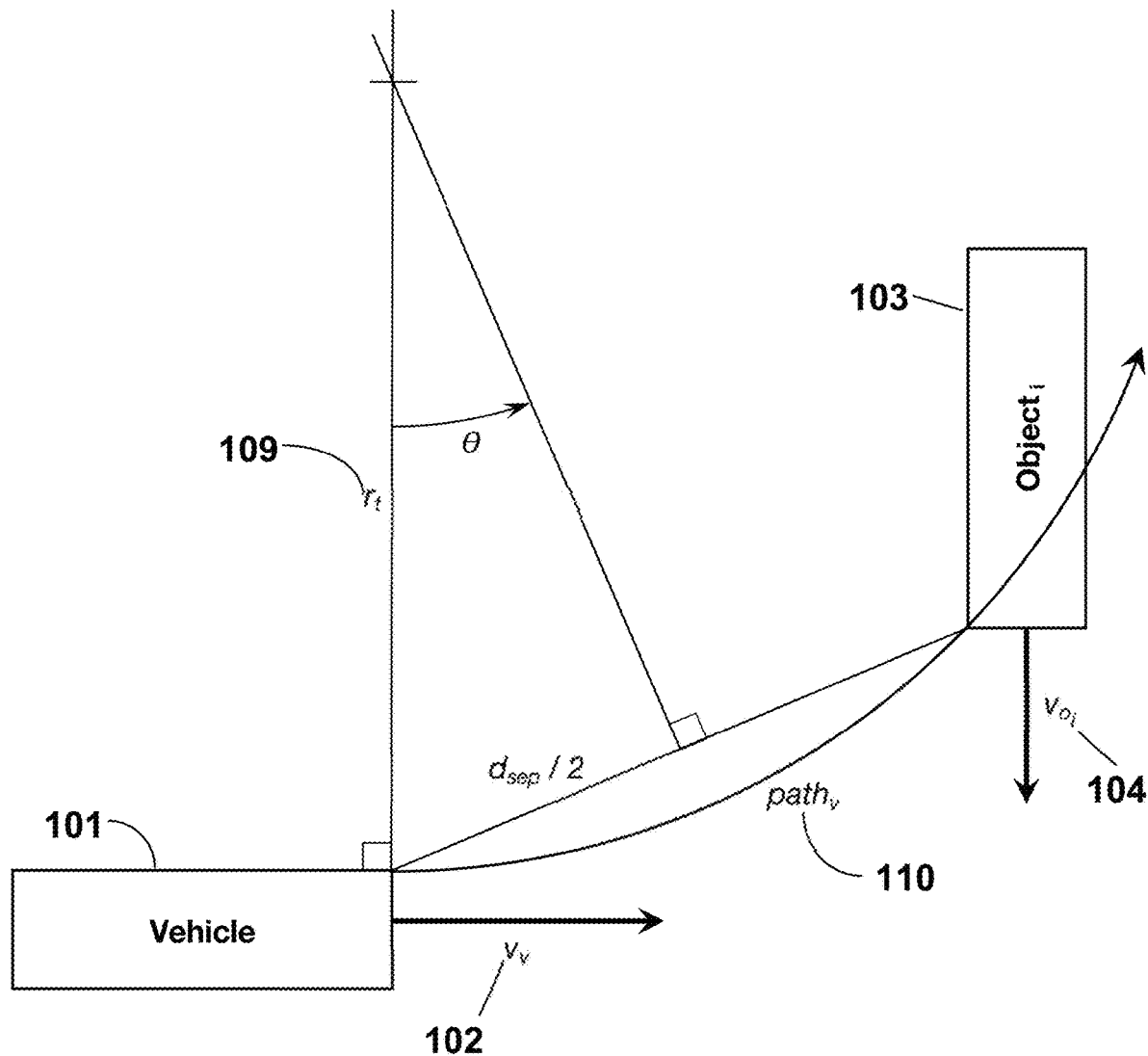
FIG. 3 shows an overhead view of the Radius $r_t$ 109 of curved path path$_v$ 110 required (with the relative positions shown in the figure) for the Subject Vehicle 101 to collide with the Traffic Object$_i$ 102.

FIG. 3 shows an overhead view of the Radius $r_t$ 109 of curved path path$_v$ 110 required (with the relative positions shown in the figure) for the Subject Vehicle 101 to collide with the Traffic Object$_i$ 103.

Figure 4:
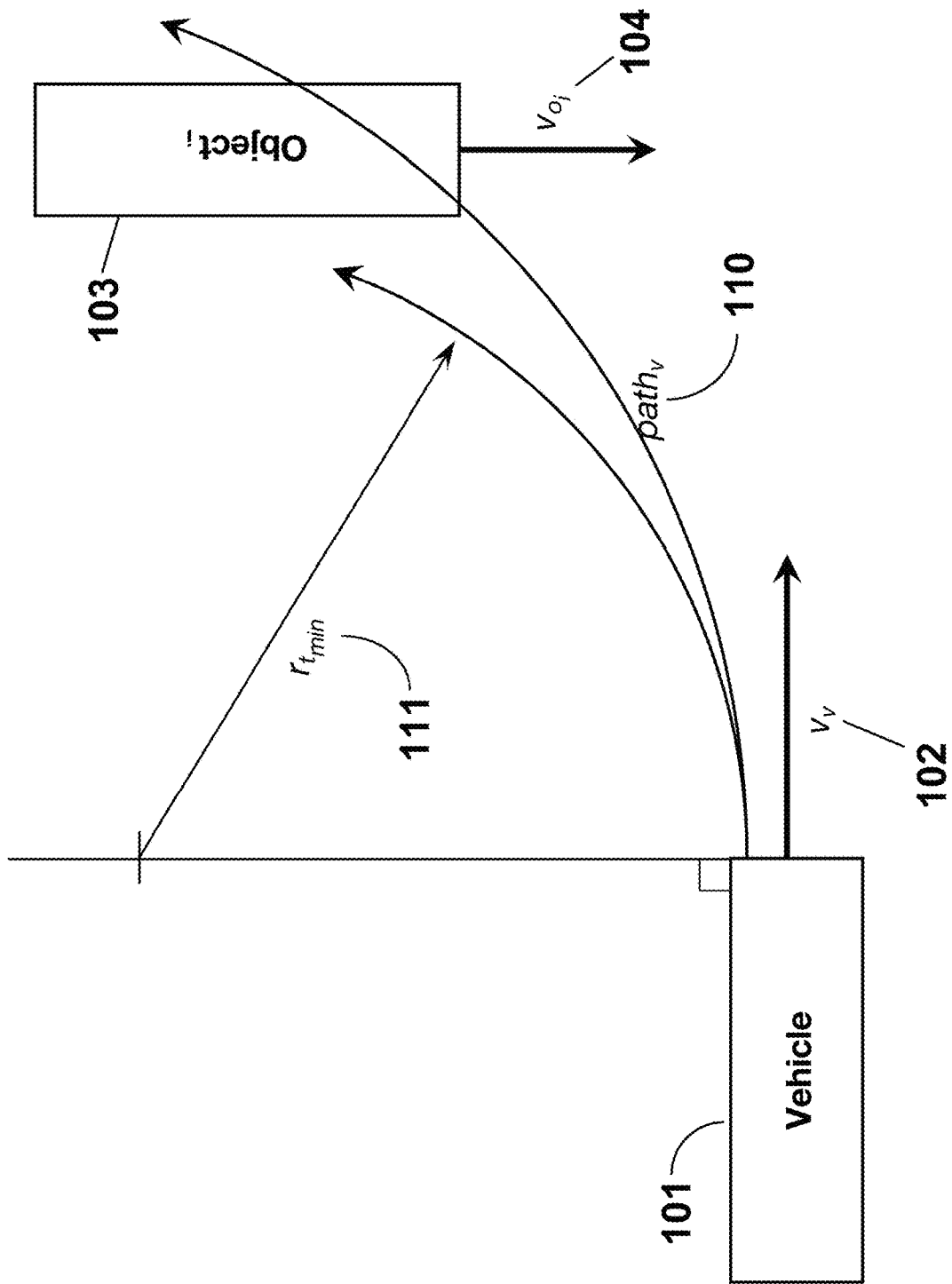
FIG. 4 shows an overhead view of the Radius $r_{t_{min}}$ 111 of sharpest turn possible without exceeding a lateral acceleration of grip.

FIG. 4 shows an overhead view of the Radius rtmin 111 of sharpest turn possible without exceeding a lateral acceleration of grip.

Figure 5:
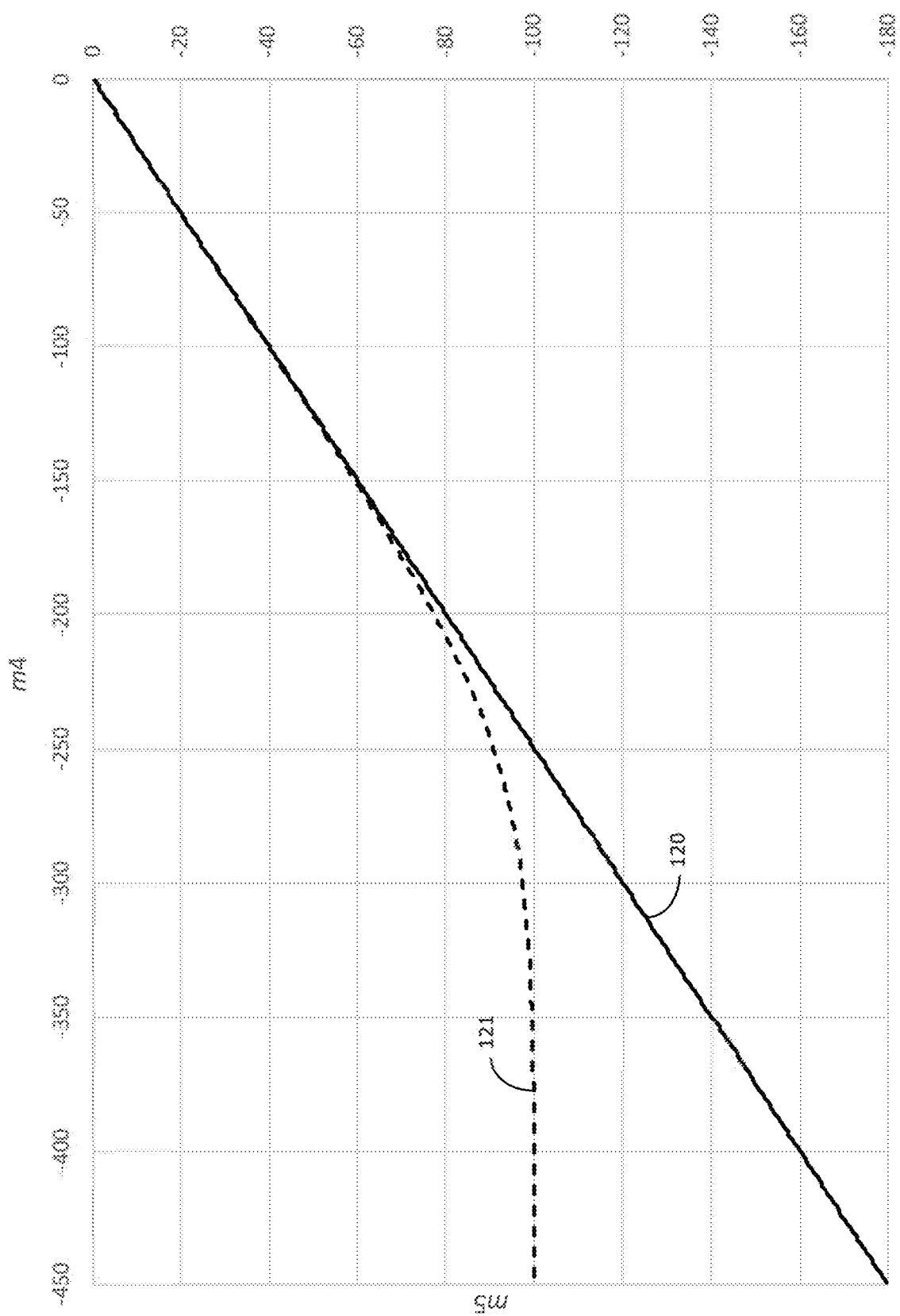
FIG. 5 shows a graph of $m_4$ 120 extending to large negative values and $m_5$ 121 smoothly limited by the saturation computation of Equation (24) to the range 0 to −100.

FIG. 5 shows a graph of m4 120 extending to large negative values and m5 121 smoothly limited by the saturation computation of Equation (24) to the range 0 to −100.

Figure 6:
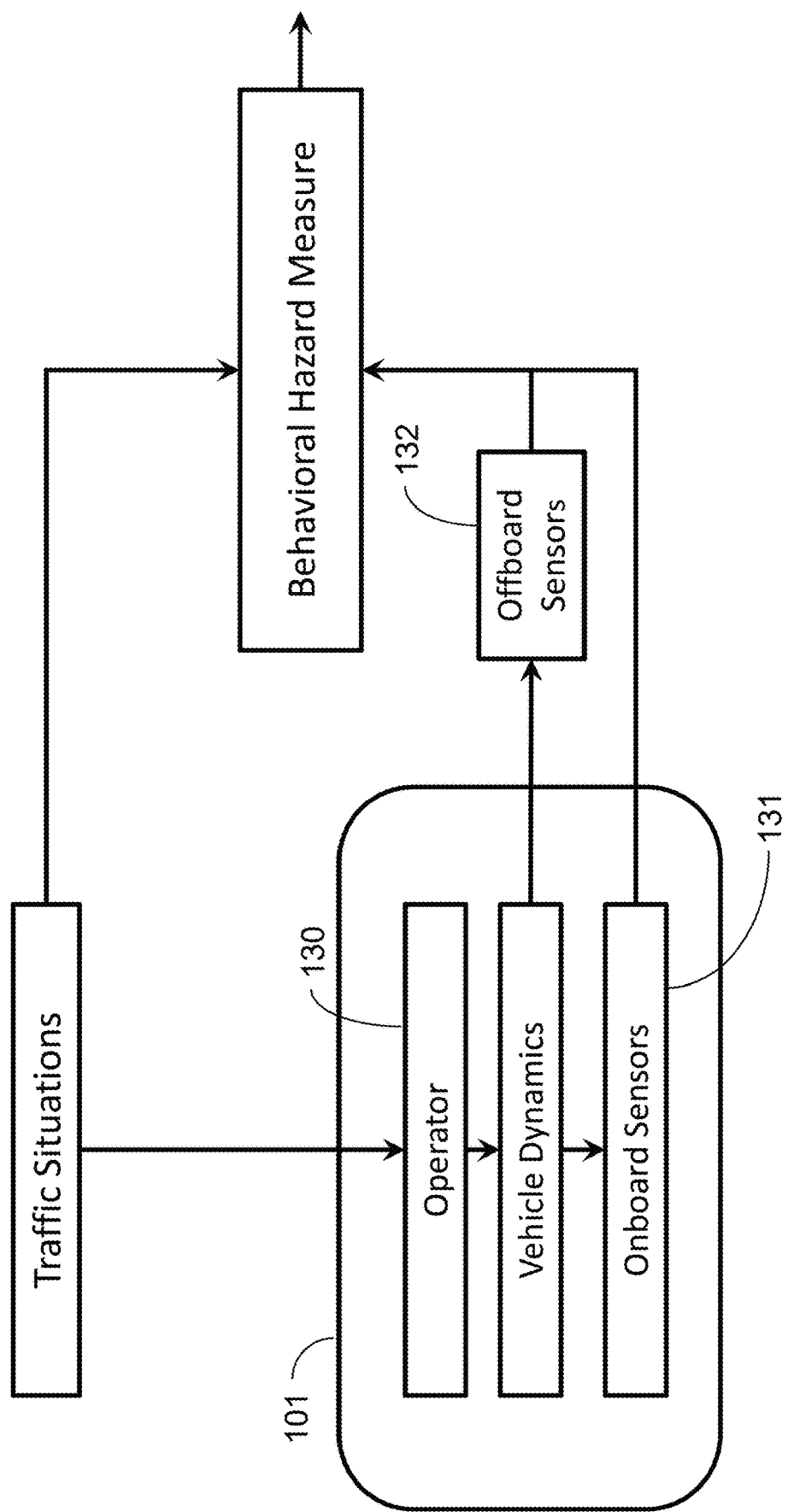
FIG. 6 shows a block diagram of a test and evaluation of the safety of a vehicle operator or driver 130.

FIG. 6 shows a block diagram of a test and evaluation of the safety of a vehicle operator 130. Data from onboard sensors 131 and/or offboard sensors 132 are utilized to compute the hazard measure of the invention.

Figure 7:
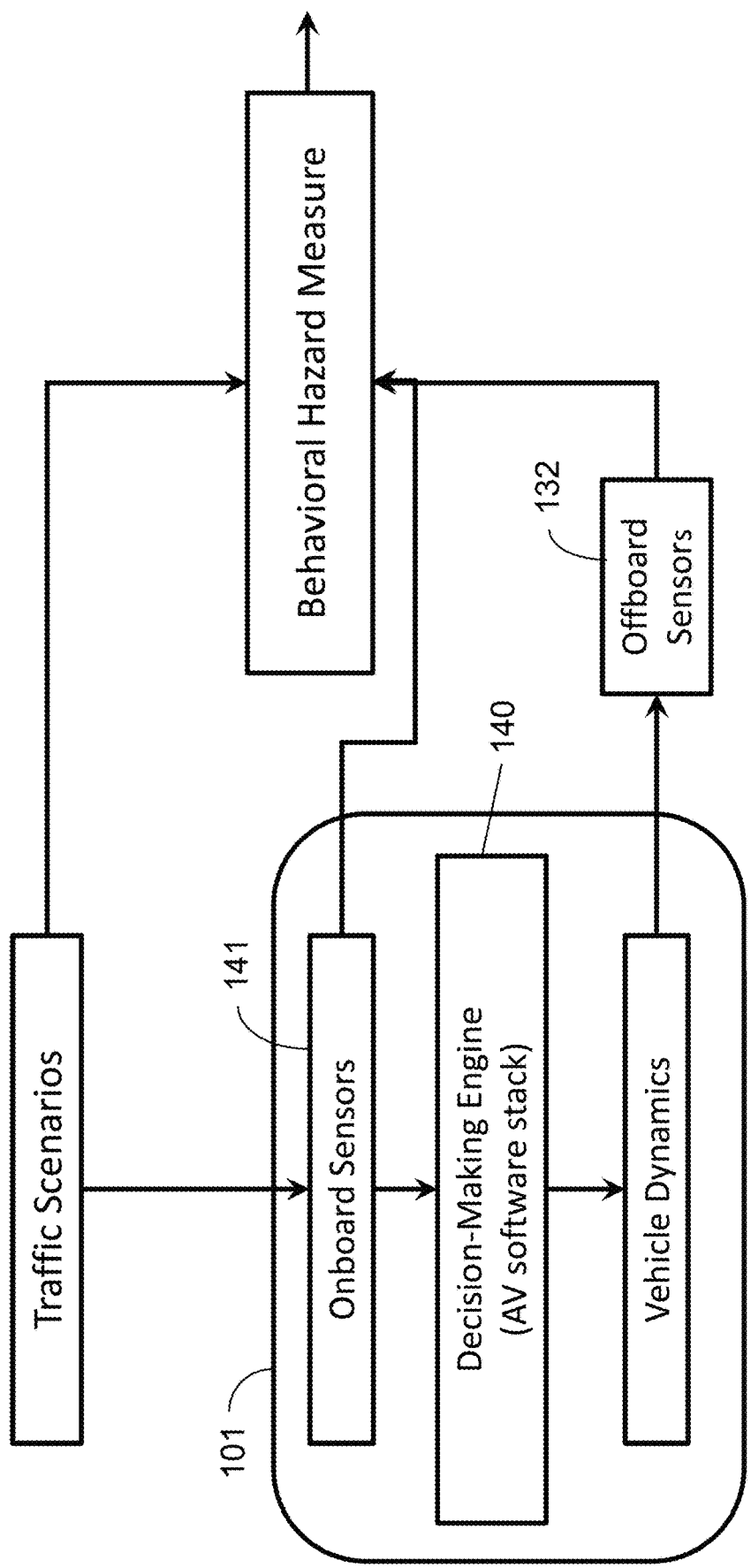
FIG. 7 shows a block diagram of a test and evaluation of the safety of an automated or autonomous vehicle sensing 141 and decision-making 140 system.

FIG. 7 shows a block diagram of a test and evaluation of the safety of an automated or autonomous vehicle sensing 141 and decision-making 140 system. Data from onboard sensors 141 and/or offboard sensors 132 are utilized to compute the hazard measure of the invention.

Figure 8:
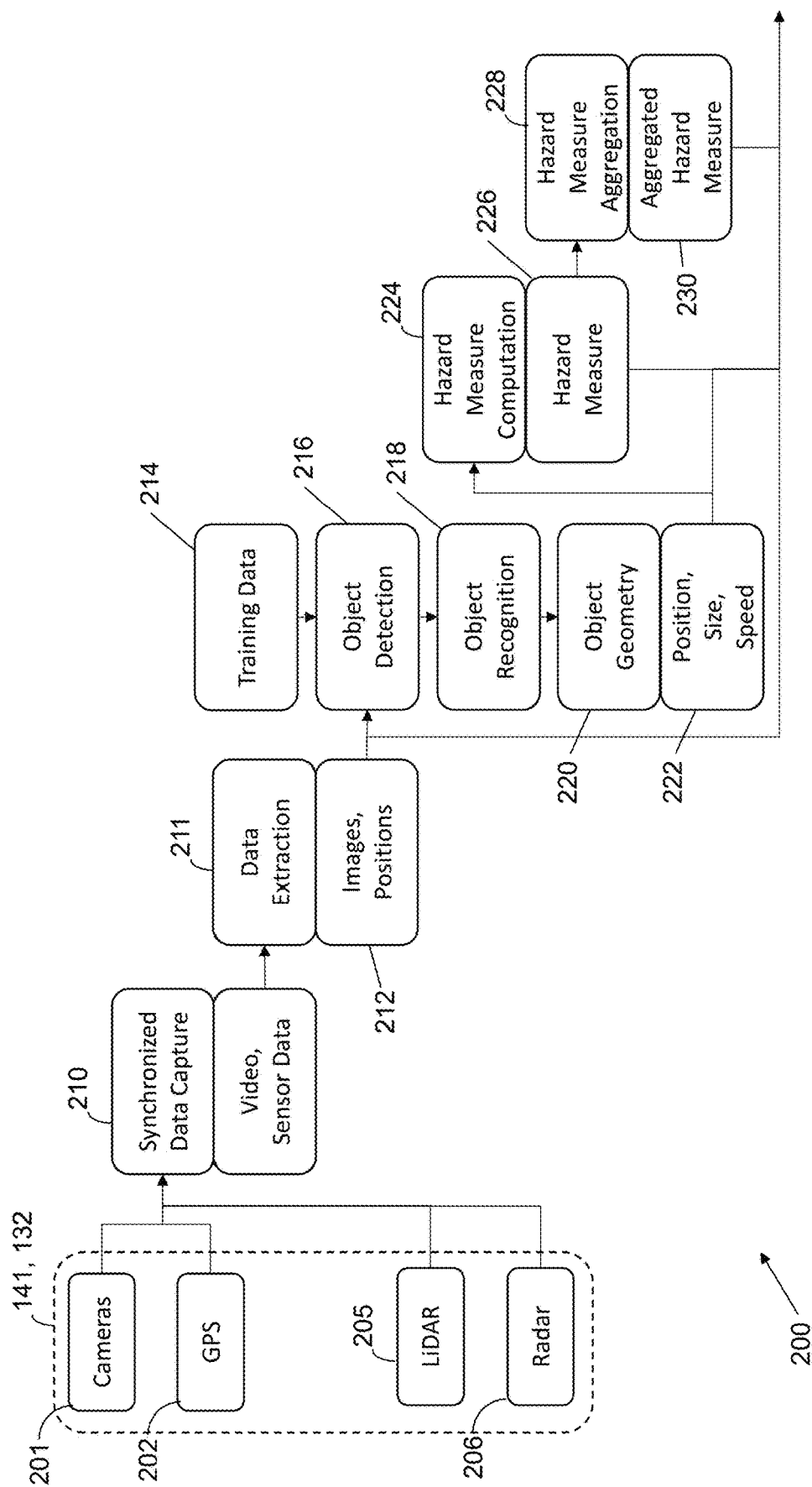
FIG. 8 shows a block diagram 200 of the data flow and data processing to compute the values of the hazard measure for data gathered from sensors 141, including 201, 202, 205, 206 which could be onboard one or more vehicles or offboard 132, captured by module 210, extracted and processed by data processing modules 220, and processed into the near-miss hazard measure in module 221 and aggregated in module 222.

FIG. 8 shows a block diagram 200 of the data flow and data processing to compute the values of the hazard measure for data gathered from different sensors 141, such as cameras 201, Global Positioning System (GPS) 202, Lidar 205, and radar 206 onboard one or more vehicles, or offboard sensors 132. A synchronized data capture module 210 collects the sensor data and data extraction module 211 produces images and positions of traffic objects 212. For example, training data 214 may be used for object detection 216 and object recognition 218. Object geometry 220 is then derived to produce geometric and kinematic data 222, e.g., position, size and speed data. This data is used in a hazard measure computation module 224, from which a hazard measure 226 is derived. Individual measures are aggregated in a hazard measure aggregation module 228, from which aggregated near-miss hazard measures 230 are derived.

Figure 9:
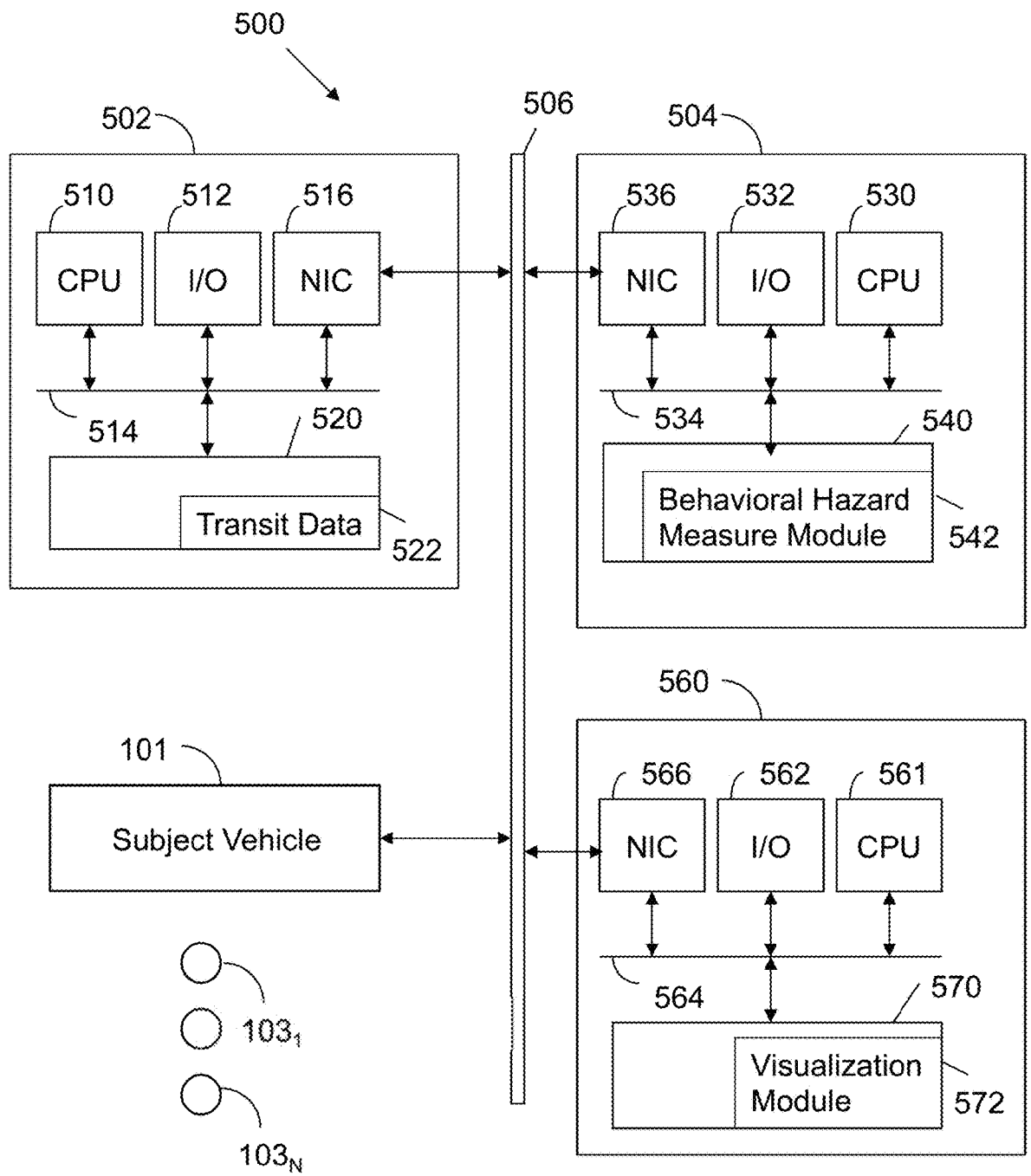
FIG. 9 illustrates a system 500 configured in accordance with an embodiment of the invention, including, for example, data processing modules 502, 504 and 560, Subject Vehicle 101 and Traffic Objects $103_1$ through $103_N$.

FIG. 9 illustrates a system 500 configured in accordance with an embodiment of the invention. The system 500 includes a first server 502 in communication with a second server 504 via a network 506, which may be any combination of wired and wireless networks. The first server 502 includes a processor (e.g., central processing unit or CPU) 510 connected to input/output devices 512 via a bus 514. The input/output devices 512 may be a proximate or remote keyboard, mouse, touch display and the like. A network interface circuit or NIC 516 is also connected to the bus 514 to provide connectivity to network 506. A memory 520 is also connected to the bus 514. The memory 520 stores transit data 522. The transit data 522 may be from sensors and other parameters collected from a Subject Vehicle 101 and different Traffic Objects $103_1$ through $103_N$, which may also be connected to the network 506. Thus, the transit data 522 may comprise an enormous collection of data from real world vehicles under test. The transit data 522 may also include data from traffic simulations, cameras recording traffic conditions for a defined regions, such as roads, intersections, highways and the like. The transit data may also include weather information, visibility conditions, current traffic conditions, historical traffic conditions, current angular sun measures, historical traffic risk data, historical loss data, aggregated traffic object data, and the like. It should be appreciated that the transit data 522 may be distributed across many machines (not shown) connected to network 506. The transit data 522 is shown on a single machine for convenience.

Server 504 includes a processor 530, input/output devices 532, bus 534 and network interface circuit 536. A memory 540 is connected to bus 534. The memory 540 stores a behavioral hazard measure module 542, which includes instructions executed by processor 530 to implement the operations disclosed herein. For example, the behavioral hazard measure module 542 may collect data from a Subject Vehicle 101 and Traffic Objects 103₁ through 103_N and the transit data 522 to perform the operations disclosed herein.

A client machine 560 may also be connected to network 506. The client machine 560 includes a processor 561, input/output devices 562, a bus 564 and a network interface circuit 566 to provide connectivity to network 506. A memory 570 is connected to bus 564. The memory 570 stores a visualization module 572 with instructions executed by processor 561 to display visualizations of data generated by the behavioral hazard measure module 542.

A first embodiment of the invention (hereinafter referred to as "$m_1$") is the computation of the relative speed between the subject vehicle and a traffic object ($S_{rel}$) divided by the distance that separates the vehicle and the object ($d_{sep}$). $S_{rel}$ and $d_{sep}$ are illustrated in the diagrams in FIGS. 1 and 2, and shown in Equation (8):

$$m_1 = S_{rel}/d_{sep} \qquad (8)$$

$m_1$ has the units of [1/time]. Note that $m_1$ is negative when $S_{rel}$ is negative indicating that the subject vehicle and a traffic object are approaching each other. $S_{rel}$ is positive when the two are separating instead of approaching. This computation and subsequently disclosed computations or embodiments are implemented as executable code in the behavioral hazard measure module 542.

A second embodiment of the invention (hereinafter referred to as "$m_2$") incorporates the maximum of the absolute speed of the subject vehicle ($S_{abs}$) and the relative speed between the subject vehicle and a traffic object ($S_{rel}$) divided by the distance that separates the vehicle and the object ($d_{sep}$), shown in Equation (9):

$$m_2 = \max(S_{abs}, S_{rel})/d_{sep} \qquad (9)$$

$m_2$ has the units of [1/time].

The additional consideration of the absolute speed $S_{abs}$ in $m_2$ (and $m_3$, $m_5$, and $m_7$ de-scribed below) is to account for cases of vehicles moving in close proximity but with only a small (or zero) relative speed, such as one vehicle following closely behind another.

A third embodiment of the invention (hereinafter referred to as "$m_3$") incorporates the square of the maximum of the absolute speed of the subject vehicle ($S_{abs}$) and the relative speed between the subject vehicle and a traffic object ($S_{rel}$) divided by the distance that separates the vehicle and the object ($d_{sep}$), shown in Equation (10):

$$m_3 = \max(S_{abs}, S_{rel})^2/d_{sep} \qquad (10)$$

$m_3$ has the units of length/time² or [acceleration].

The influence of the speed of the subject vehicle in relation to the traffic object is considerably magnified in $m_3$ compared to any prior approach. This magnification is desired and is an important characteristic of the invention since the square of the speed is directly proportional to the kinetic energy of the subject vehicle in relation to the traffic object and the dissipation of kinetic energy in a collision is the cause of damage and injury.

A modified version of $m_3$ is also used in the invention, shown in Equation (11):

$$m_{3_{raw}} = m_3/\text{grip} \qquad (11)$$

where grip is the maximum safe acceleration that the vehicle can exert in either braking (deceleration or longitudinal acceleration) or turning (lateral acceleration or change of direction) in the present road or street conditions. $m_{3_{raw}}$ has the units of [fraction of grip]. For dry roads and streets, grip has a value of approximately 0.5 g or approximately 5 m/s².

$m_3$ and particularly $m_{3_{raw}}$ has values that can be directly related to traffic and vehicle behavior and safety. When $m_{3_{raw}}$ equals 1.0, the near-miss measure produced by the invention equals the maximum safe acceleration that the subject vehicle can exhibit. While thresholds are for traffic safety authorities to set, a near-miss that would require the maximum safe acceleration of the subject vehicle to avoid is likely a cause for concern.

It is preferred that the invention maintains the sign convention established by $m_1$ in that the value of $m_3$ is negative when the subject vehicle and a traffic object are approaching each other (i.e., the relative speed between them is negative). However, the opposite sign convention, i.e., $m_3$ is positive when the subject vehicle and a traffic object are approaching each other, is within the scope of the invention.

A fourth embodiment of the invention (hereinafter referred to as "m4") incorporates a modulation (i.e., reduction) of the results of the measure by the lateral acceleration (steering or change or direction) capabilities of the subject vehicle and traffic objects, and limited by the minimum turning radius $r_{running}$ of the subject vehicle and each traffic object. This modulation is $u_{vehicle}$ in Equations (14) and (15), and $u_{object}$ in Equations (18) and (19). The modulation (or reduction) of $m_3$ accounts for situations where the severity of the near-miss (measured strictly by $(S_{rel})^2/d_{sep}$) is reduced by the limitation of the ability of the subject vehicle or the traffic object to accelerate laterally (steer) to cause a collision.

$$r_{t_{vehicle}} = (d_{sep}/2)/|\sin(\theta_{vehicle})| \qquad (12)$$

$$a_{lateral_{vehicle}} = S_{abs_{vehicle}}^2/r_{t_{vehicle}} \qquad (13)$$

$$u_{vehicle} = 1 - (a_{lateral_{vehicle}}/\text{grip}) \qquad (14)$$

$$\text{if } r_{t_{vehicle}} < r_{turning_{vehicle}}; u_{vehicle} = 0 \qquad (15)$$

$$r_{t_{object}} = (d_{sep}/2)/|\sin(\theta_{object})| \qquad (16)$$

$$a_{lateral_{object}} = S_{abs_{object}}^2/r_{t_{object}} \qquad (17)$$

$$u_{object} = 1 - (a_{lateral_{object}}/\text{grip}) \qquad (18)$$

$$\text{if } r_{t_{object}} < r_{turning_{object}}; u_{object} = 0 \qquad (19)$$

$$m_4 = m_{3_{raw}} \times \max(u_{vehicle}, u_{object}) \qquad (20)$$

$r_{t_{vehicle}}$ and $\theta$ and the curved path $path_v$ that the subject vehicle would need to follow to cause a collision are illustrated in FIG. 3.

FIG. 4 illustrates the curved path with radius $r_{t_{min}}$ which is a sharper turn (i.e., smaller radius) than $path_v$ and is the sharpest turn possible without exceeding a lateral acceleration of grip.

$$r_{t_{min}} = S_{abs}^2/\text{grip} \qquad (21)$$

Note that $r_{t_{min}}$ is limited to be greater than or equal to the minimum turning radius $r_{turning}$ of the subject vehicle and the traffic object, as shown in Equations (15) and (19). The modulator $u_{vehicle}$ has a value of 1.0 when $path_v$ is a straight line ($r_t \rightarrow \infty$; $a_{lateral} = 0.0$), and decreases to a value of 0.0 when $path_v$ has a radius $r_t$ of $r_{t_{min}}$ or smaller.

$m_4$ accounts for consideration of the following: if the subject vehicle and the traffic object were to collide, what lateral acceleration (steering or change or direction) would be required to do so? $m_4$ reduces $m_3$ by the portion of grip that would be required to steer to cause a collision.

It is preferred that the invention maintains the sign convention established by $m_1$ and maintained by $m_3$ in that the value of $m_4$ is negative when the subject vehicle and a traffic object are approaching each other (i.e., the relative speed between them is negative). However, the opposite sign convention, i.e., $m_4$ is positive when the subject vehicle and a traffic object are approaching each other, is within the scope of the invention.

A further embodiment of the invention (hereinafter referred to as "$m_5$") incorporates a limitation (or "saturation") of the maximum value that the measure can achieve. As can be seen by Equation (10), $m_3$ (and therefore also $m_4$) can become arbitrarily large when the denominator $d_{sep}$ (separation distance) becomes small, and in the limit $m_3$ and $m_4$ can grow to infinity when $d_{sep}$ goes to zero (i.e., in a collision). To alleviate the challenges of utilizing a measure whose value can become arbitrarily large, $m_5$ introduces a limitation (or "saturation") at a pre-determined maximum value. The saturation of the measure is accomplished by means of an integral of the equation for a sigmoid $Sig(x)$, shown in Equation (22):

$$Sig(x) = \frac{1}{1+e^{-\alpha x}} \qquad (22)$$

where $\alpha$ is a parameter to adjust the curvature of the sigmoid.

The invention uses an integral of the sigmoid function (rather than the sigmoid function itself) to provide a smooth transition from increasing values of $m'_3$ to a saturation level. Functions other than the sigmoid or integral of the sigmoid could be used to provide a limitation or saturation of hazard measure values, including a logarithm, natural logarithm, exponential, polynomial, transcendental, or simple maximum or minimum functions.

h is the largest (negative) value of $m_5$, typically 100. $m_5$ ranges continuously from 0 to $-h$. sat is the level of $m_4$ at which $m_5$ saturates (or is limited).

$$m_{4_{scaled}} = m_4 \times h \times (h/sat) \qquad (23)$$

$$m_5 = m_{4_{scaled}} + \left(\frac{1}{\alpha}\ln\left(e^{-\alpha m_{4_{scaled}}} + 1\right)\right) - h \qquad (24)$$

where $\alpha$ is a parameter to adjust the curvature of the transition from $m_3$ to the saturation level. An example graph showing the curved transition of $m_5$ from $m_4$ to a saturation level (at $-100$) is shown in FIG. 5. Illustrative values are: h=100; sat=300; $\alpha$=0.075.

It is preferred that the invention maintains the sign convention established by $m_1$ and maintained by $m_3$ and $m_4$ in that the value of $m_5$ is negative when the subject vehicle and a traffic object are approaching each other (i.e., the relative speed between them is negative). However, the opposite sign convention, i.e., $m_5$ is positive when the subject vehicle and a traffic object are approaching each other, is within the scope of the invention.

The embodiments of the invention described above can be augmented by incorporating the perception-reaction time (PRT) of the driver or controller of the vehicle. All operators of vehicles, whether human or sensors and computers, will exhibit a perception-reaction time, where perception is the process of analyzing and understanding the sensor data and reaction is the process of deciding and sending commands to the vehicle. Typical human driver PRTs are around 1.5 seconds, and range from 750 milliseconds to over 3.5 seconds. There is little published data on automated or autonomous vehicle PRTs, but the published data suggests that they are between 11 and 200 milliseconds.

A further embodiment of the invention (hereinafter referred to as "$m_6$") incorporates PRT is by estimating the distance that the vehicle will travel during the PRT, assuming no change in direction or speed for the duration of the PRT, shown in Equation (25):

$$d_{reaction} + S_{abs} \times t_{reaction} \qquad (25)$$

where $t_{reaction}$ is the PRT of the controller or operator of the vehicle.

The addition of PRT is accomplished by reducing $d_{sep}$ by $d_{reaction}$. Therefore $m_6$ is a revision of $m_5$ where the basis of the computation of $m_6$ is shown in Equation (26):

$$m_6 = S_{rel}^2/(d_{sep} - d_{reaction}) \qquad (26)$$

The value of $d_{sep} - d_{reaction}$ is limited to be greater than or equal to zero, as shown in Equation (27):

$$m_6 = S_{rel}^2/\max(0,(d_{sep} - d_{reaction})) \qquad (27)$$

In a manner consistent with the embodiments described above, $m_6$ incorporates the square of the maximum of the absolute speed of the subject vehicle ($S_{abs}$) and the relative speed between the subject vehicle and a traffic object ($S_{rel}$) divided by the distance that separates the vehicle and the object ($d_{sep}$), shown in Equation (28):

$$m_6 = \max(S_{abs}, S_{rel})^2/\max(0,(d_{sep} - d_{reaction})) \qquad (28)$$

$m_6$ has the units of length/time$^2$ or [acceleration].

In a manner consistent with the embodiments described above, the influence of the speed of the subject vehicle in relation to the traffic object is considerably magnified in $m_6$ compared to $m_1$ or $m_2$. This magnification is desired and is an important characteristic of the invention since the square of the speed is directly proportional to the kinetic energy of the subject vehicle in relation to the traffic object and the dissipation of kinetic energy in a collision is the cause of damage and injury.

A modified version of $m_6$ is also used in the invention, shown in Equation (29):

$$m_{6_{raw}} = m_6/\text{grip} \qquad (29)$$

where grip is the maximum safe acceleration that the vehicle can exert in either braking (deceleration) or turning (lateral acceleration). $m_{6_{raw}}$ has the units of [fraction of grip]. For dry roads and streets, grip has a value of approximately 0.5 g or 5 m/s$^2$.

$m_6$ and particularly $m_{6_{raw}}$ has values that can be directly related to traffic and vehicle behavior and safety. When $m_{6_{raw}}$ equals 1.0 the near-miss measure produced by the invention equals the maximum safe acceleration that the subject vehicle can exhibit. While thresholds are for traffic safety authorities to set, a near-miss that would require the maximum safe acceleration of the subject vehicle to avoid is likely a cause for concern.

It is preferred that the invention maintains the sign convention established by $m_1$ and maintained by $m_3$, $m_4$, and $m_5$ in that the value of $m_6$ and $m_{6_{raw}}$ is negative when the subject vehicle and a traffic object are approaching each other (i.e., the relative speed between them is negative). However, the opposite sign convention, i.e., $m_6$ is positive when the subject vehicle and a traffic object are approaching each other, is within the scope of the invention.

A further embodiment of the invention (hereinafter referred to as "$m_7$") incorporates a modulation (i.e., reduction) of the results of the measure by the lateral acceleration (steering) capabilities of the subject vehicle and traffic objects, and limited by the minimum turning radius $r_{turning}$ of the subject vehicle and each traffic object, in the same manner as described above in relation to $m_4$, and shown in Equations (12) through (21).

A further embodiment of the invention (hereinafter referred to as "$m_8$") incorporates a limitation (or "saturation") of the maximum value that the measure $m_7$ can achieve, in the same manner as described above in relation to $m_5$, and shown in Equations (22) through (24).

At each time step for which sensor data is available and the positions and motions of the Subject Vehicle and surrounding Traffic Objects can be determined, a hazard measure value can be computed as described above for each pair of vehicle(s) and object(s). These individual values can usefully be aggregated into composite scores for a variety of purposes and uses.

A first embodiment of aggregation of hazard measure values (also referred to as cumulative measures of hazard) is to establish one or more levels or thresholds and count the number of hazard measure values for one or more vehicle(s) and/or objects(s) that fall above and/or below each threshold over a period of time.

A second embodiment of aggregation of hazard measure values is to establish one or more levels or thresholds and count the number of hazard measure values for one or more vehicle(s) and/or objects(s) that fall above and/or below each threshold over a distance of travel.

A third embodiment of aggregation of hazard measure values is to establish one or more levels or thresholds and count the number of hazard measure values for one or more vehicle(s) and/or objects(s) that fall above and/or below each threshold over a route.

A fourth embodiment of aggregation of hazard measure values is to establish one or more levels or thresholds and count the number of hazard measure values for one or more vehicle(s) and/or objects(s) that fall above and/or below each threshold within a region.

A fifth embodiment of aggregation of hazard measure values is to establish one or more levels or thresholds and count the number of hazard measure values for one or more vehicle(s) and/or objects(s) that fall above and/or below each threshold within an intersection or segment of a road or street.

A sixth embodiment of aggregation of hazard measure values is to establish one or more levels or thresholds and count the number of hazard measure values for one or more vehicle(s) and/or objects(s) that fall above and/or below each threshold for one or more road or street condition(s).

A seventh embodiment of aggregation of hazard measure values is to establish one or more levels or thresholds and count the number of hazard measure values for one or more vehicle(s) and/or objects(s) that fall above and/or below each threshold for one or more visibility condition(s), including weather, precipitation, fog, sun angle, lighting condition, etc.

An eighth embodiment of aggregation of hazard measure values is to establish one or more levels or thresholds and count the number of hazard measure values for one or more vehicle(s) and/or objects(s) that fall above and/or below each threshold for one or more traffic condition(s).

A ninth embodiment of aggregation of hazard measure values is to determine the extremal values of the hazard measure, e.g., the maximum and/or minimum (best and/or worst) value, or a combination of a number of the maximum and/or minimum values.

A tenth embodiment of aggregation of hazard measure values is to utilize a static and/or moving average of the values.

An eleventh embodiment of aggregation of hazard measure values is to utilize a static and/or moving average of the values where more recent values are weighted more than older values.

A twelfth embodiment of aggregation of hazard measure values is to utilize an exponentially weighted moving average (EMWA) of the values where more recent values are weighted more than older values according to an exponential or geometric rate of decrease, shown in Equation (30).

$$m_{EWMA} = \beta \sum_{i=1}^{n} (1-\beta)^{(i-1)} m(t_i) \qquad (30)$$

where n is the number of values to be included in the EMWA, and the coefficient $\beta$ represents the degree of weighting decrease, a constant between 0 and 1. A larger value of $\beta$ reduces the contribution of older observations faster than a smaller value of $\beta$.

A thirteenth embodiment of aggregation of hazard measure values is to aggregate the values of the hazard measure for one or more individual operators of each vehicle and/or traffic object. This method of aggregation, which can utilize any of the aggregation methods described above, can form a safety score for each operator.

Hazard data gathered over time in the form of frequency of occurrence of hazard values can be correlated with historical traffic risk data and/or historical collision and/or loss data, such as frequency of occurrence and severity or risk of damage or harm. The correlation can be utilized to form one or more forecast values of frequency of occurrence and severity or risk of damage or harm.

In the development of automated or autonomous vehicles (AVs), simulations are commonly used to test and evaluate the sensors and decision-making of the AV system. One application of the invention is to measure and assess the behavior of AVs in simulation. One or more scenarios would be presented to a simulation system; simulated sensor data representative of the scenario would be generated and presented to the AV decision-making engine (computer and software); vehicle commands would be generated by the AV decision-making engine and presented to a vehicle dynamics model. The motions of the AV would then be presented to an integrated analysis and visualization system to display the motions of the AV in the scenario and to analyze its behavior. The invention can be applied to the analysis and visualization step of this simulation process to measure the safety and risk of the behavior of the AV.

In the development of AVs, field tests are commonly used to test and evaluate the AV system and its integration into the vehicle. One application of the invention is to measure and assess the behavior of AVs in field tests. As with the simulation process described above, the AV would be presented with a situation and its sensor data, decisions, vehicle commands and motions would be measured and assessed. The invention can be applied to the assessment step of this test process to measure the safety and risk of the behavior of the AV.

The invention can also be used in continuous assessment and evaluation of the safety and risk of AVs during development, test, or deployment. For example, the value produced by the invention can be used to adjust or affect the behavior of the vehicle (e.g., to command the vehicle to reduce its speed if the value produced by the invention is above a threshold). The invention can also be used in periodic or continuous training of a computer system such as a neural network, providing feedback to the computer system on its behavior in development, test, or deployment.

In the development of AVs and vehicle safety systems, comparisons of the performance of subsystems are commonly performed. The invention can be applied to the assessment of the results of such comparisons to measure the safety and risk of the behavior of the AV or vehicle safety system, and to compare the numerical results of the invention from one subsystem to another, or from one situation or scenario or test condition to another.

The invention can be implemented in software running on a computer onboard a vehicle, or on a computer running at a stationary location where vehicle motion data is available. These stationary locations can include traffic management centers and/or traffic management boxes, such as those at traffic control signals.

The invention can be implemented in one or more hardware devices such as integrated semiconductor chips and used in any of the applications or locations described above.

The invention can be integrated into the software or hardware of a camera or camera system, a LiDAR or LiDAR system, a radar or radar system, or into the software running on a computer onboard a vehicle, or it can be one or more integrated semiconductor chips operating onboard a vehicle.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A vehicle, comprising:
   a data interface that receives traffic object data from sensors including one or more of a camera, a Global Positioning System, Lidar and radar resident in the vehicle;
   a processor in the vehicle connected to the data interface; and
   a memory in the vehicle connected to the processor, the memory storing instructions executed by the processor to:
   process the traffic object data to form geometric and kinematic data; and
   process the geometric and kinematic data to form a hazard measure, where the hazard measure is computed through operations to:
   obtain a relative speed between a first traffic object and a second traffic object,
   receive a separation distance between the first traffic object and the second traffic object,
   combine the relative speed and the separation distance to form a quantitative measure of hazard encountered by the first traffic object, wherein the instructions to combine include instructions to:
   apply a compensating factor to the relative speed to form a compensated relative speed, and
   divide the compensated relative speed by the separation distance,
   repeat the obtain, receive and combine operations to form cumulative measures of hazard associated with the first traffic object,
   analyze the cumulative measures of hazard to derive a first traffic object safety score for the first traffic object; and
   adjust or affect the behavior of the vehicle in response to the first traffic object safety score.

2. The vehicle of claim 1, wherein the compensating factor is the square of the relative speed.

3. The vehicle of claim 1 wherein the instructions to combine the relative speed and the separation distance are executed for each new value of the relative speed and the separation distance.

4. The vehicle of claim 1 wherein the instructions to combine the relative speed and the separation distance include instructions to incorporate a deceleration measure.

5. The vehicle of claim 1 wherein the instructions to combine the relative speed and the separation distance include instructions to incorporate a change of direction measure.

6. The vehicle of claim 1 wherein the instructions to combine the relative speed and the separation distance include instructions to incorporate a road condition measure.

7. The vehicle of claim 1 wherein the cumulative measures of hazard are collected over time or distance for a transportation session completed by the first traffic object.

8. The vehicle of claim 1 further comprising instructions executed by the processor to collect cumulative measures of hazard over time or distance for multiple traffic objects.

9. The vehicle of claim 1 further comprising instructions executed by the processor to collect cumulative measures of hazard over time or distance for a defined region.

10. The vehicle of claim 1 further comprising instructions executed by the processor to collect cumulative measures of hazard for a road intersection.

11. The vehicle of claim 1 wherein the cumulative measures of hazard are associated with a route.

12. The vehicle of claim 1 wherein the cumulative measures of hazard are associated with specified road conditions.

13. The vehicle of claim 12 wherein the specified road conditions are specified weather conditions.

14. The vehicle of claim 12 wherein the specified road conditions are visibility conditions.

15. The vehicle of claim 12 wherein the specified road conditions are traffic conditions.

16. The vehicle of claim 12 wherein the specified road conditions are angular sun measures.

17. The vehicle of claim 1 further comprising instructions executed by the processor to compare the cumulative measures of hazard to a hazard threshold to derive periods above or below the hazard threshold.

18. The vehicle of claim 1 further comprising instructions executed by the processor to compute one or more extremal values of the cumulative measures of hazard.

19. The vehicle of claim 1 further comprising instructions executed by the processor to compute one or more averages of the cumulative measures of hazard.

20. The vehicle of claim 1 further comprising instructions executed by the processor to compute the cumulative measures of hazard from a moving average.

21. The vehicle of claim 1 wherein the cumulative measures of hazard weigh older values less than more recent values.

22. The vehicle of claim 1 wherein an exponentially weighted moving average is applied to the cumulative measures of hazard.

23. The vehicle of claim 1 further comprising instructions executed by the processor to correlate the cumulative measures of hazard with historical traffic data.

24. The vehicle of claim 1 further comprising instructions executed by the processor to correlate the cumulative measures of hazard with historical traffic risk data.

25. The vehicle of claim 1 further comprising instructions executed by the processor to correlate the cumulative measures of hazard with historical loss data.

26. The vehicle of claim 1 further comprising instructions executed by the processor to correlate the cumulative measures of hazard with frequency of occurrence and severity of damage or harm measures from aggregated traffic object data.

27. The vehicle of claim 1 further comprising instructions executed by the processor to correlate the cumulative measures of hazard with a risk of damage or harm for aggregated traffic object data.

28. The vehicle of claim 1 further comprising instructions executed by the processor to forecast a frequency of occurrence and severity of damage or harm from the cumulative measures of hazard.

29. The vehicle of claim 1 further comprising instructions executed by the processor to forecast a frequency of occurrence and severity of damage or harm from the cumulative measures of hazard.

30. The vehicle of claim 1 further comprising instructions executed by the processor to associate the first traffic object safety score with an operator.

31. A vehicle, comprising:
a data interface that receives traffic object data from sensors including one or more of a camera, a Global Positioning System, Lidar and radar resident in the vehicle;
a processor in the vehicle connected to the data interface; and
a memory in the vehicle connected to the processor, the memory storing instructions executed by the processor to:
process the traffic object data to form geometric and kinematic data; and
process the geometric and kinematic data to form a hazard measure, where the hazard measure is computed through operations to:
obtain a relative speed between a first traffic object and a second traffic object,
receive a separation distance between the first traffic object and the second traffic object,
combine the relative speed and the separation distance to form a quantitative measure of hazard encountered by the first traffic object, wherein the instructions to combine the relative speed and the separation distance include instructions to incorporate an absolute speed measure and to combine the square of the absolute speed measure and the relative speed and then divide by the separation distance,
repeat the obtain, receive and combine operations to form cumulative measures of hazard associated with the first traffic object,
analyze the cumulative measures of hazard to derive a first traffic object safety score for the first traffic object; and
adjust or affect the behavior of the vehicle in response to the first traffic object safety score.

32. The vehicle of claim 31, wherein the instructions to combine include instructions to:
apply a compensating factor to the relative speed to form a compensated relative speed; and
divide the compensated relative speed by the separation distance.

33. The vehicle of claim 32, wherein the compensating factor is the square of the relative speed.

34. The vehicle of claim 31 wherein the instructions to combine the relative speed and the separation distance are executed for each new value of the relative speed and the separation distance.

35. The vehicle of claim 31 wherein the instructions to combine the relative speed and the separation distance include instructions to incorporate a deceleration measure.

36. The vehicle of claim 31 wherein the instructions to combine the relative speed and the separation distance include instructions to incorporate a change of direction measure.

37. The vehicle of claim 31 wherein the instructions to combine the relative speed and the separation distance include instructions to incorporate a road condition measure.

38. A vehicle, comprising:
a data interface that receives traffic object data from sensors including one or more of a camera, a Global Positioning System, Lidar and radar resident in the vehicle;
a processor in the vehicle connected to the data interface; and
a memory in the vehicle connected to the processor, the memory storing instructions executed by the processor to:
process the traffic object data to form geometric and kinematic data; and
process the geometric and kinematic data to form a hazard measure, where the hazard measure is computed through operations to:
obtain a relative speed between a first traffic object and a second traffic object,
receive a separation distance between the first traffic object and the second traffic object,
combine the relative speed and the separation distance to form a quantitative measure of hazard encountered by the first traffic object, wherein the instructions to combine the relative speed and the separation distance include instructions to incorporate a traffic object maximum safe acceleration measure and wherein the instructions to combine the relative speed and the separation distance include instructions to subtract lateral acceleration required to cause a collision from the quantity of one divided by the traffic object maximum safe acceleration measure,
repeat the obtain, receive and combine operations to form cumulative measures of hazard associated with the first traffic object,
analyze the cumulative measures of hazard to derive a first traffic object safety score for the first traffic object; and
adjust or affect the behavior of the vehicle in response to the first traffic object safety score.

39. The vehicle of claim 38 wherein the instructions to combine the relative speed and the separation distance include instructions to incorporate a traffic object maneuverability measure.

40. The vehicle of claim 38 wherein the sigmoid function is applied to the cumulative measures of hazard.

41. The vehicle of claim 38 wherein the integral of the sigmoid function is applied to the cumulative measures of hazard.

42. The vehicle of claim 38 wherein a logarithm function is applied to the cumulative measures of hazard.

43. The vehicle of claim 42 wherein the logarithm function is the natural logarithm function.

44. The vehicle of claim 38 wherein an exponential function is applied to the cumulative measures of hazard.

45. A vehicle, comprising:
a data interface that receives traffic object data from sensors including one or more of a camera, a Global Positioning System, Lidar and radar resident in the vehicle;
a processor in the vehicle connected to the data interface; and
a memory in the vehicle connected to the processor, the memory storing instructions executed by the processor to:
process the traffic object data to form geometric and kinematic data; and
process the geometric and kinematic data to form a hazard measure, where the hazard measure is computed through operations to:
obtain a relative speed between a first traffic object and a second traffic object,
receive a separation distance between the first traffic object and the second traffic object,
combine the relative speed and the separation distance to form a quantitative measure of hazard encountered by the first traffic object, wherein the instructions to combine the relative speed and the separation distance include instructions to incorporate a perception-reaction time (PRT) measure and wherein the separation distance is reduced by the PRT measure,
repeat the obtain, receive and combine operations to form cumulative measures of hazard associated with the first traffic object,
analyze the cumulative measures of hazard to derive a first traffic object safety score for the first traffic object; and
adjust or affect the behavior of the vehicle in response to the first traffic object safety score.

46. The vehicle of claim 45, wherein the instructions to combine include instructions to:
apply a compensating factor to the relative speed to form a compensated relative speed; and
divide the compensated relative speed by the separation distance.

47. The vehicle of claim 46, wherein the compensating factor is the square of the relative speed.

48. The vehicle of claim 45 wherein the instructions to combine the relative speed and the separation distance are executed for each new value of the relative speed and the separation distance.

49. The vehicle of claim 45 wherein the instructions to combine the relative speed and the separation distance include instructions to incorporate a deceleration measure.

50. The vehicle of claim 45 wherein the instructions to combine the relative speed and the separation distance include instructions to incorporate a change of direction measure.

51. The vehicle of claim 45 wherein the instructions to combine the relative speed and the separation distance include instructions to incorporate a road condition measure.

* * * * *